Patented Oct. 7, 1924.

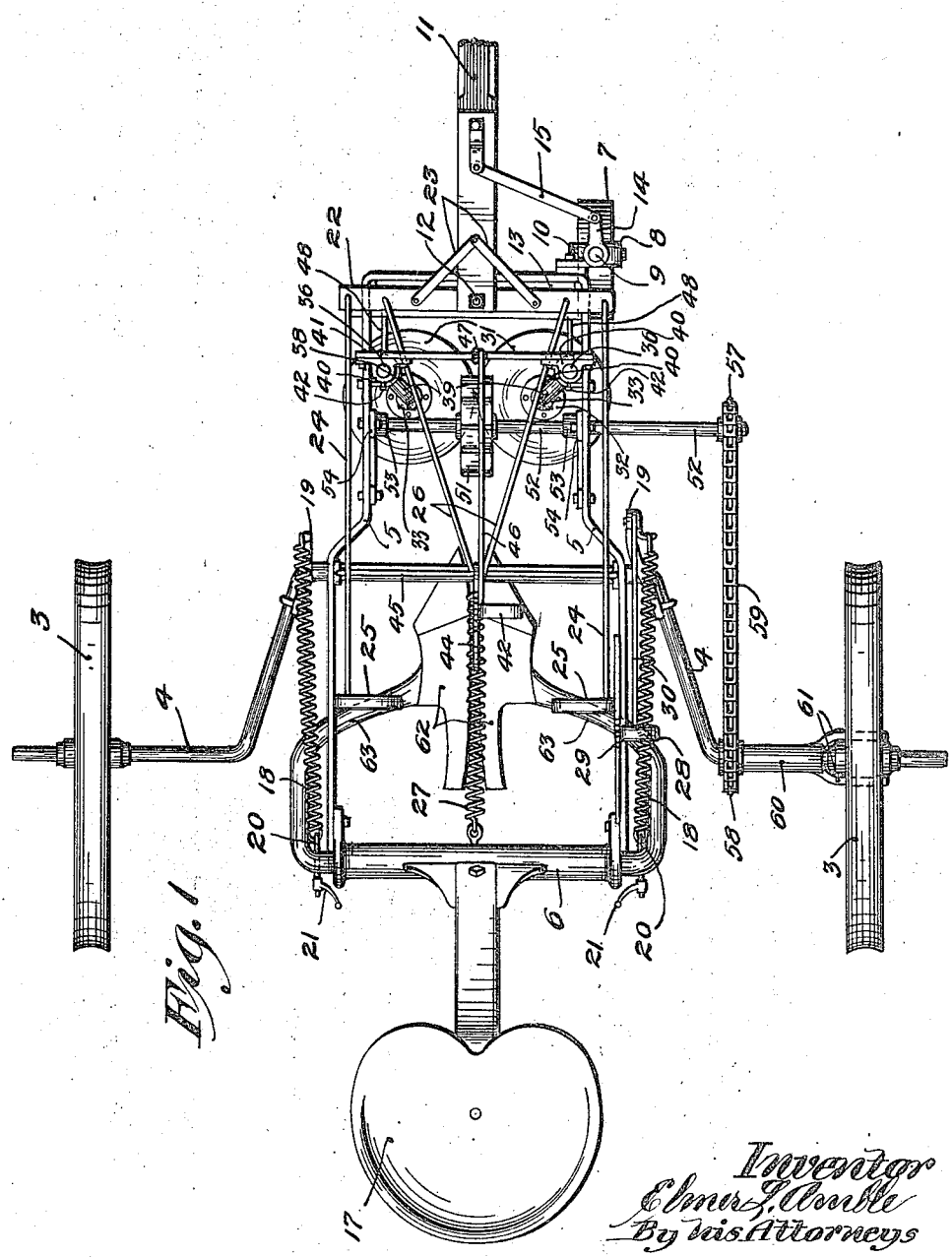

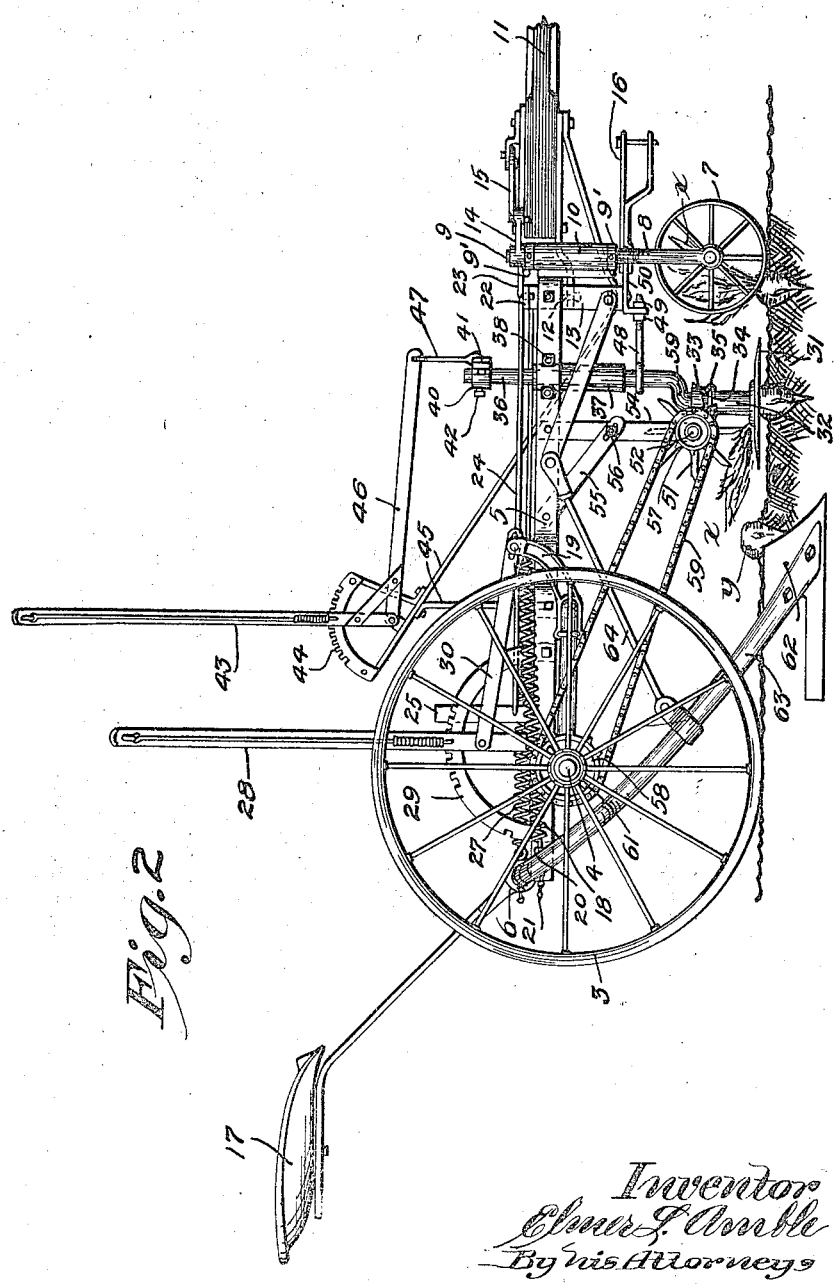

1,510,452

UNITED STATES PATENT OFFICE.

ELMER L. AMBLE, OF FROST, MINNESOTA, ASSIGNOR OF TWO-FIFTHS TO CHRISTIAN HANSON, OF FROST, MINNESOTA.

COMBINED SUGAR-BEET TOPPER AND LIFTER.

Application filed October 28, 1922. Serial No. 597,557.

*To all whom it may concern:*

Be it known that I, ELMER L. AMBLE, a citizen of the United States, residing at Frost, in the county of Faribault and State of Minnesota, have invented certain new and useful Improvements in Combined Sugar-Beet Toppers and Lifters; and I do hereby declare the following to be a full, clear, and exact description of the invention, such as will enable others skilled in the art to which it appertains to make and use the same.

My invention has for its object to provide a highly efficient sugar beet topper and lifter, and to this end the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the invention; and

Fig. 2 is a right side elevation of the same.

The numeral 3 indicates a pair of wheels journaled on a crank axle 4 which supports a skeleton rectangular frame 5, the rear end of which is in the form of a bearing sleeve 6. A single guide wheel 7 is located at the front of the frame 5, and is journaled in a forked bearing 8 having an upright shaft 9 turnably mounted in a vertical bearing sleeve 10 rigidly secured to the frame 5 at the front right-hand corner thereof. Opposing collars 9' on the shaft 9 engage the ends of the bearing sleeve 10 and hold said shaft against endwise movement therein. A pole 11, to which draft animals may be attached, is pivoted at 12 to a frame member 13 rigidly bolted to the sides of the frame 5 at the front transverse member thereof.

To impart steering or guiding movements to the wheel 7, an arm 14 is rigidly secured to the shaft 9 above the sleeve 10, which arm is connected by a link 15 to the pole 11. A clevis 16 is attached to the frame member 13 below the pole 11. Supported from the bearing sleeve 6 is a seat 17 which, when occupied by an operator of the machine, substantially balances the machine on the crank axle 4 so that very little weight comes on the wheel 7. Lifting springs 18 are attached at their front ends to arms 19 on crank portions of the axle 4, and their rear ends are attached to eye bolts 20 which are mounted for endwise sliding movement on extensions on the ends of the bearing sleeves 6, and equipped with handle-equipped nuts 21 which may be adjusted at will to vary the tension of the springs 18 to suit the weight of the operator.

A transverse steering bar 22 is rigidly secured to the rear end of the pole 11 by the pivot 12 and braces 23. A pair of rearwardly extended rods 24 are secured to the outer ends of the steering bar 22 and provided at their rear ends with foot pieces 25. Suitable means, not shown, will be provided for supporting and guiding said foot pieces 25. Said foot pieces 25 afford foot rests for the operator and may be manipulated to swing the bar 22, and hence the pole 11 and wheel 7, through the link 15, to cause the machine to dodge, as will presently appear. Also attached to the outer edge portions of the steering bar 22 is a pair of converging rods 26 to the connected rear ends of which it attached a coiled spring 27 anchored to the bearing sleeve 6 and under strain to automatically hold the machine in the normal line of draft. To operate the crank axle 4 and thereby raise or lower the frame 5, there is provided a latch lever 28 and cooperating segments 29, which latch lever is connected by a link 30 to the outer end of one of the arms 19.

To cut the tops *x* from beets *y*, before they are lifted from the ground, I provide a pair of cooperating cutting discs 31 arranged to rotate, when moved into engagement with the tops of beets, under the advance movement of the machine in substantially the same horizontal plane, and have rigidly secured to their upper faces axially located sleeves 32 rotatably mounted in hubs 33. The sleeves 32 are held suspended from the hubs 33 by forming thereon external flanges 34 rotatably mounted in internal channels 35 in said hubs. Vertical shafts 36 for the cutting discs 31 are mounted in bearing sleeves 37 for compound rotary and endwise movements, which bearing sleeves are secured at their upper ends by U-bolts 38 to the side bars 35 with freedom for slight angular movements longitudinally of the frame 5. The lower end portions of the shafts 36 are laterally offset to form depending crank extensions 39, to which the hubs 33 are rigidly secured and on which the cutting discs 31 and their sleeves 32 are free to rotate.

The upper ends of the shafts 36, above the bearing sleeves 37, are mounted in bearings 40 rigidly secured to a floating cross tie-bar 41, which shafts are adjustably but rigidly secured in said bearings by set screws 42. To raise and lower the cutting discs 31 and hold the same in a predetermined distance above the ground, I provide a latch lever 43 and a cooperating segment 44 secured to a bracket 45 attached to the frame 5 and to the frame member 13. Rigidly secured to the lower or pivoted end of the latch lever 43 is an arm 46 connected by a link 47 to the intermediate portion of the cross tie-bar 41.

To hold the shafts 36 in true upright positions or tilt the same longitudinally of the frame 5, said shafts, below the bearing sleeves 10, are inserted through eye bolts 48 rigidly but adjustably secured by opposing nuts 49 to brackets 50 on the frame member 13.

Working over the cutting discs 31, at their cooperating cutting edges, is a toothed wheel or reel 51 provided for removing the cut tops x of the beets y from said discs. This wheel or reel 51 is rigidly secured to a horizontal shaft 52 journaled in bearings 53 in the lower ends of a pair of depending arms 54 pivoted at their upper ends to the side members of the frame 5. The arms 54 are held against pivotal movement by a pair of braces 55 secured to the side members of the frame 5 and connected to the arms 54 by nut-equipped bolts 56 which extend through bores in said arms and longitudinal slots in said braces. The right-hand end of the shaft 52 is extended outward from the frame 5, and has keyed thereto a sprocket wheel 57 aligned with a sprocket wheel 58 over which sprocket wheels runs a sprocket chain 59. The sprocket wheel 58 is secured to a sleeve 60 on the axle 4 and provided with a fork 61, the prongs of which extend between certain of the spokes of the respective wheel 3 to cause said wheel to impart a rotary movement to the sprocket wheel 58. Obviously, by loosening the nut-equipped bolts 56, the arms 54 may be adjusted to afford a chain tightener for the sprocket chain 59.

To lift the beets y from the ground after the tops x have been cut therefrom by the cutting discs 31, I provide a pair of lifting blades 62 arranged to run in the ground, one on each side of a row of beets, and lift the same under the advance movement of the machine. These lifting blades 62 are rigidly secured to the lower ends of a pair of forwardly and downwardly inclined arms 63, the upper end portions of which are extended horizontally inward and mounted in the bearing sleeve 6. Brace rods 64, extending from the arms 63 to the frame 5, hold said arms properly positioned.

The operation of the above described machine may be briefly described as follows:

By lifting the latch lever 28 the frame 5 may be raised or lowered to cause the lifting blades 62 to enter the ground at the desired depth. The cutting discs 31 may be raised or lowered to cut the tops at the desired point by manipulating the latch lever 43. Under the advance movement of the machine, the cutting discs 31 are caused to rotate as they are moved into engagement with the tops x and thereby cut said tops x which are removed from the cutting discs 31 by the wheel or reel 51. By loosening the set screws 42, the shafts 36 may be turned to cause their crank extensions 39 to move the cutting discs 31 toward or from each other to properly position said cutting discs in respect to each other to secure the best results when the growth of the tops are either light or heavy, or to adjust said cutting discs after they have been ground. The turning movement of the pole 11 by the draft animals will impart like movements to the guide wheel 7, but the operator always has the steering movement of the machine under control through the connections 24 and 25 to the steering bar 22 to cause the machine to dodge or swing abruptly to follow a row of beets that is not straight. By adjusting the nuts 49, the eye bolts 48 may be horizontally moved endwise to swing the shaft 36 longitudinally of the frame 5 and thereby properly position the cutting discs 41 irrespective of the adjustment of the frame 5 by the crank axle 4.

What I claim is:

1. A machine of the kind described including a pair of co-operating cutting discs arranged to rotate in substantially the same plane, said discs being independently vertically adjustable, one of said cutting discs being horizontally adjustable in its one plane toward and from the other cutting disc.

2. A machine of the kind described including a frame, a vertical shaft turnably mounted in the frame and having at its lower end a depending crank-like extension, a pair of cooperating rotatable cutting disks, one of which is journaled on said crank-like extension, and means for securing the shaft to hold the respective cutting disk in different adjustments in respect to the other of said cutting disks.

3. A machine of the kind described including a frame, a pair of vertical shafts turnably mounted in the frame, said shafts having at their lower ends depending crank-like extensions, a pair of cooperating cutting discs loosely journaled on said crank-like extensions, and means for securing the shafts with the cutting discs in horizontal adjustments in respect to each other.

4. The structure defined in claim 3 in which the shafts are vertically adjustable.

5. The structure defined in claim 3 in which the shafts may be tilted to angularly adjust the cutting discs longitudinally of the machine and in respect to the frame.

6. The structure defined in claim 3 in further combination with means for simultaneously raising and lowering the cutting discs and holding the same in different vertical positions.

7. A machine of the kind described including a frame, a pair of vertical shafts turnably mounted in the frame, said shafts having at their lower ends depending crank-like extensions, hubs on said crank-like extensions, a pair of cooperating cutting discs having sleeves loosely journaled on said crank-like extensions and having interlocking engagement with said hubs to support the cutting discs.

In testimony whereof I affix my signature.

ELMER L. AMBLE.